United States Patent [19]
Lin et al.

[11] Patent Number: 6,034,015
[45] Date of Patent: *Mar. 7, 2000

[54] CERAMIC COMPOSITIONS FOR MICROWAVE WIRELESS COMMUNICATION

[75] Inventors: Wen-Yi Lin, Doraville; Robert F. Speyer, Atlanta, both of Ga.; Tom R. Shrout, Port Matilda; Wesley S. Hackenberger, State College, both of Pa.

[73] Assignee: Georgia Tech Research Corporation, Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 09/079,047

[22] Filed: May 14, 1998

Related U.S. Application Data

[60] Provisional application No. 60/046,417, May 14, 1997.

[51] Int. Cl.$^7$ ................................................. C04B 35/468
[52] U.S. Cl. .................................................................. 501/137
[58] Field of Search ............................................. 501/137

[56] References Cited

U.S. PATENT DOCUMENTS

| | | | |
|---|---|---|---|
| 4,337,446 | 6/1982 | O'Bryan, Jr. et al. | 333/238 |
| 4,353,047 | 10/1982 | Noguchi et al. | 333/247 |
| 4,468,472 | 8/1984 | Kashima et al. | 501/137 |
| 4,563,661 | 1/1986 | O'Bryan, Jr. et al. | 333/202 |
| 4,749,669 | 6/1988 | Nishigaki et al. | 501/139 |
| 5,133,129 | 7/1992 | Thomson, Jr. | 29/600 |
| 5,202,814 | 4/1993 | Kohno et al. | 361/321 |
| 5,272,122 | 12/1993 | Mizuno et al. | 501/137 |
| 5,290,740 | 3/1994 | Abe et al. | 501/139 |
| 5,332,984 | 7/1994 | Abe et al. | 333/219 |
| 5,378,663 | 1/1995 | Abe et al. | 501/32 |
| 5,407,876 | 4/1995 | Michiura et al. | 501/137 |
| 5,486,491 | 1/1996 | Sengupta et al. | 501/137 |
| 5,512,524 | 4/1996 | Negas et al. | 501/138 |

FOREIGN PATENT DOCUMENTS

| | | |
|---|---|---|
| 401111724A | 4/1989 | Japan . |
| 402220304 | 9/1990 | Japan . |
| 402239511 | 9/1990 | Japan . |

OTHER PUBLICATIONS

Elastic and Dielectric Properties of $Ba_{2-x}Sr_xTi_9O_{20}$ Ceramics; Jpn. J. Appl. Phys. vol. 35 (1996) pp. 673–676, Part 1, No. 2A, Feb. 1996.

Journal of the American Ceramic Society "Effect of Ordering–Induced Domain Boundaries on Low–Loss $Ba(Zn_{1/3}Ta_{2/3})O_3$–$BaZrO3$ Perovskite Microwave Dielectrics", Peter K. Davies and Jianzhu Tong (1997).

Journal of the American Ceramic Society "Dielectric Measurements on High–Q Ceramics in the Microwave Region", Denesh C. Dube (1977).

"The Ternary Systems $BaO–TiO_2–SnO_2$ and $BaO–TiO_2–ZrO_2$" G.H. Jonker and W. Kwestroo, Phillips Research Laboratories, Elndhaven, Netherlands (1958).

Dielertric Resonators "A Designer's Guide to Microwave Dielectric Ceramics", Trans–Tech, Inc.

Specification data of related products: Alpha Industries, Inc., URL–http://www.alphaind.com/products/specs/8600/8600.htm, Jul. 10, 1997.

Specification data of related products: Alpha Industries, Inc., URL–http://www.alphaind.com/products/specs/transtec/8700/8700.htm, Jul. 10, 1997.

Specification data of related products: Alpha Industries, Inc., URL–http://www.alphaind.com/products/specs/transtec/8300/8300.htm, Jul. 10, 1997.

Specification data of related products: Lorch Microwave, Inc., URL–http://wwww.lorch.com/ceramic..html, Jul. 10, 1997.

Specification data of related products: K&L Microwave, Inc., URL–http://www.KLMicrowave.com/ceramic.htm, Jul. 10, 1997.

CA 121:123719 "A Study on Synthesis of Ba2Ti9020 by Coprecipitation Process and the Effect of ZrO2 Addition", Lee et al., 1993.

CA 124:296711 Microstructure and Dielectric Propertiwes of BA2(Ti8.472Zr0.528)O2O, Baik et al., 1996.

CA 123:294382 "Effect of TI4+/Sn4+ Substitution on BaTi9O2O Synthesis", Teoreanu et al., 1995.

Primary Examiner—Karl Group
Attorney, Agent, or Firm—Thomas, Kayden, Horstemeyer & Risley, L.L.P.

[57] ABSTRACT

A composition of $Ba_2Ti_9O_{20}$ suitable for use in microwave wireless communications is provided. $Ba_2Ti_9O_{20}$ doped with Zr is formed by combining starting materials containing barium, titanium and zirconium. In a preferred embodiment of the invention, zirconium-doped $Ba_2Ti_9O_{20}$ is formed by combining $BaCO_3$ and $TiO_2$, and substituting an appropriate amount of $ZrO_2$ for a portion of the $TiO_2$. The relative proportion of $Ba_2Ti_9O_{20}$ obtained as a result is increased over that which may be obtained using other dopants, such as tin (Sn). Forming $Ba_2Ti_9O_{20}$ with a Zr dopant in the appropriate amount also results in greater stability of the dielectric constant, an increase in the quality factor, and a decrease in the temperature coefficient than exhibited by other compositions of $Ba_2Ti_9O_{20}$ that lack a Zr dopant.

15 Claims, 7 Drawing Sheets

| SPECIMEN | DENSITY (g/cm³) | DIELECTRIC CONSTANT | QUALITY FACTOR AT 3 GHz | TEMPERATURE COEFFICIENT (ppm/°C) | | |
|---|---|---|---|---|---|---|
| | | | | 20–60°C | 60–97°C | 97–119°C |
| 0.82%Sn, 6h | 4.53 | 39.5 | 11900 | 1.8 | 3.8 | 4.5 |
| 1.64%Sn, 6h | 4.59 | 39.1 | 12900 | 1.3 | 3.1 | 4.2 |
| 2.46%Sn, 6h | 4.59 | 38.8 | 12900 | 1.4 | 2.8 | 3.7 |
| 0.82%Sn, 16h | 4.53 | 39.1 | 11600 | | | |
| 1.64%Sn, 16h | 4.56 | 38.8 | 12700 | | | |
| 2.46%Sn, 16h | 4.58 | 38.7 | 13100 | | | |
| 0.82%Zr, 6h | 4.48 | 39.1 | 12400 | 4.5 | 6.2 | 7.0 |
| 1.64%Zr, 6h | 4.56 | 39.3 | 13900 | 2.3 | 2.8 | 4.2 |
| 2.46%Zr, 6h | 4.50 | 38.8 | 8600 | 0.1 | 1.7 | 2.6 |
| 0.82%Zr, 16h | 4.44 | 38.4 | 12300 | | | |
| 1.64%Zr, 16h | 4.51 | 39.1 | 13800 | | | |
| 2.46%Zr, 16h | 4.46 | 40.8 | 3000 | | | |
| 1.64%Ti, 6h | 4.49 | 40.2 | 2100 | | | |
| 1.64%Ti, 16h | 4.49 | 38.3 | 3300 | | | |
| $BaTi_4O_9$, 6h | 4.37 | 37.2 | 13900 | 21.4 | 18.1 | 14.0 |
| $BaTi_4O_9$, 16h | 4.34 | 36.9 | 13800 | | | |

FIG.7

CERAMIC COMPOSITIONS FOR MICROWAVE WIRELESS COMMUNICATION

CROSS REFERENCE TO RELATED APPLICATIONS

The present application claims priority to and the benefit of the filing date of Provisional Patent Application Ser. No. 60/046,417 filed May 14, 1997, entitled "Zirconium Ion-Doped Barium Polytitanate Dielectric Resonator for Microwave Wireless Communication," which, in its entirety, is hereby incorporated by reference in this application.

FIELD OF THE INVENTION

The present invention generally relates to the field of ceramic compositions having excellent electrical properties and, more particularly, to ceramic compositions especially adapted for use as electrical components for microwave applications such as receivers for satellite broadcasting systems, wireless communications equipment, dielectric resonators for cellular telephone equipment, and detection devices such as frequency sensors.

BACKGROUND OF THE INVENTION

The development of dielectric resonators for telecommunications has experienced rapid growth in the past decade. Owing to the high dielectric constants, quality factors, and near-zero temperature coefficients of dielectric resonators, microwave-sensing receivers have been dramatically miniaturized. A variety of applications utilizing these relatively low-cost ceramics have been developed for various applications such as personal communication systems, global positioning systems, and personal digital cellular systems.

Several microwave dielectric resonator materials have been developed in recent years. Microwave signals are generally regarded as having signal frequencies in the range from 0.4 to 200 GHz. Dielectric materials are especially useful for resonator and other microwave wireless communications over the 0.5–20 GHz range. A highly attractive material is $(Zr_{0.8}Sn_{0.2})TiO_4$ which has a dielectric constant of 38, a quality factor of 8400 at 7 GHz, and a temperature coefficient of –0.1 ppm/° C. However, the drawback of using this ceramic is the difficulty in machining the sintered pellets to desired dimensions.

Another popular microwave ceramic adopts a complex perovskite structure in the form of $A(Bi_{1/3}E_{2/3}O_3)$, where A is selected from the group consisting of Ba and Sr; B is selected from the group consisting of Ni, Ca, Zn, Mg, Co and Zr; and E is selected from the group consisting of Ta and Nb. Although $Ba(Zn,Ta)O_3$ has a high quality factor (10000 at 7 GHz), dielectric constant (29), and temperature coefficient (1 ppm/° C.), the sintering process requires higher temperature (1500–1600° C.) and prolonged sintering times for ordering Zn and Ta cations. An unavoidable disadvantage of using this microwave ceramic in designing a light-weight device is its higher density (7.7 g/cm$^3$) relative to other material candidates.

$Ba_2Ti_9O_{20}$ has also received attention for its good microwave properties, quality factor (10,000 at 4 GHz), dielectric constant (39.8), and temperature coefficient (2 ppm/° C.). Titanium ions are located at octahedral sites. This pseudo-hexagonal arrangement has a nine layer stacking sequence with a primitive triclinic cell. Eight barium ions reside in a triclinic cell; four of them are 12-coordinated by oxygen while the other four have a vacancy present in the adjacent barium ions. It has been suggested that this Ba-vacancy-Ba sequence may facilitate better dielectric properties than the other barium polytitanates. However, it has been pointed out that $Ba_6Ti_{17}O_{40}$ and $Ba_4Ti_{13}O_{30}$ do not have superior dielectric properties, though they have more barium vacancies per unit cell. Further investigation of microwave properties by analyzing far-infrared reflection spectra using the dielectric dispersion equation has been hampered by the complex crystal structure of $Ba_2Ti_9O_{20}$. $(Zr_{0.8}Sn_{0.2})TiO_4$ and $A(B_{1/3}E_{2/3})O_3$ (perovskite) have simpler structures and thus, theoretical predictions have been made for their dielectric properties at microwave frequencies.

$Ba_2Ti_9O_{20}$ has been a difficult phase to fabricate without batch additives which form a solid solution. Tin ion dopants have been used in the form of $SnO_2$ and $BaSnO_3$ batch additives in several studies to stabilize $Ba_2Ti_9O_{20}$, and their microwave properties have been evaluated. The substitution of $Sn^{+4}$ for $Ti^{+4}$ lowered the temperature coefficient without significantly degrading the dielectric constant. U.S. Pat. No. 4,563,661 to O'Bryan, et al., involves an apparatus for processing microwave electrical energy formed from a barium-titanium compound having nominal formula $Ba_2Ti_9O_{20}$ doped with Sn.

$Nd_2O_3$ additions have been used to stabilize $Ba_2Ti_9O_{20}$. $Nd_2O_3$ additions increased the dielectric constant and temperature coefficient but lowered the quality factor. It has been suggested that the quality factor could be improved with the addition of Mn acting as an oxidizing agent. Addition of up to 5 mol % $Sr^{+2}$ reportedly stabilized $Ba_2Ti_9O_{20}$.

Although it has been noted that zirconium substitution also has stabilizing effects, the microwave properties of $Zr^{4+}$-doped $Ba_2Ti_9O_{20}$ have not been thoroughly evaluated.

Accordingly, there is a need in the industry to provide for an alternative doping mechanism for $Ba_2Ti_9O_{20}$ that enhances the use of $Ba_2Ti_9O_{20}$ in microwave wireless communications applications.

SUMMARY OF THE INVENTION

As will be explained more fully hereinafter, the present invention, by providing for the doping of $Ba_2Ti_9O_{20}$ with zirconium (Zr) at optimum dopant levels, temperature and sintering times, overcomes the inadequacies and deficiencies of the prior art as noted above and as generally known in the industry.

The present invention is a composition of $Ba_2Ti_9O_{20}$ doped with zirconium (Zr), which is formed by combining starting raw materials containing barium (Ba), titanium (Ti), and zirconium (Zr). In a preferred embodiment of the invention, $Ba_2Ti_9O_{20}$ is formed by combining $BaCO_3$ and $TiO_2$, and by substituting an appropriate amount of $ZrO_2$ for a portion of the $TiO_2$. This substitution results in an increase in the relative proportion of $Ba_2Ti_9O_{20}$ obtained over that which may be obtained using other dopants, such as tin (Sn). Forming $Ba_2Ti_9O_{20}$ with a Zr dopant in the appropriate amount also results in greater stability of the dielectric constant, an increase in the quality factor, and a decrease in the temperature coefficient than exhibited by other compositions of $Ba_2Ti_9O_{20}$ that lack a Zr dopant.

The numerous objects, features, and advantages of the present invention will become apparent to one with skill in the art upon examination of the drawings and the following detailed description. Any and all additional objects, features and advantages which may become apparent are intended to be included herein within this disclosure.

BRIEF DESCRIPTION OF THE DRAWINGS

FIG. 7 is a table summarizing the microwave properties of doped compositions of Ba$_2$Ti$_9$O$_{20}$ sintered at 1390° C. from BaCO$_3$ (electronic grade), TiO$_2$ (anatase, electronic grade), and various mole percentages of ZrO$_2$ and SnO$_2$ (substituted for part of the TiO$_2$), pre-reacted at 1200° C. for 4 hours. For comparison purposes, FIG. 7 also summarizes the microwave properties of undoped compositions of Ba$_2$Ti$_9$O$_{20}$ with 1.64 mol % excess TiO$_2$, as well as compositions of BaTi$_4$O$_9$.

DETAILED DESCRIPTION OF THE PREFERRED EMBODIMENTS

Figure 1:
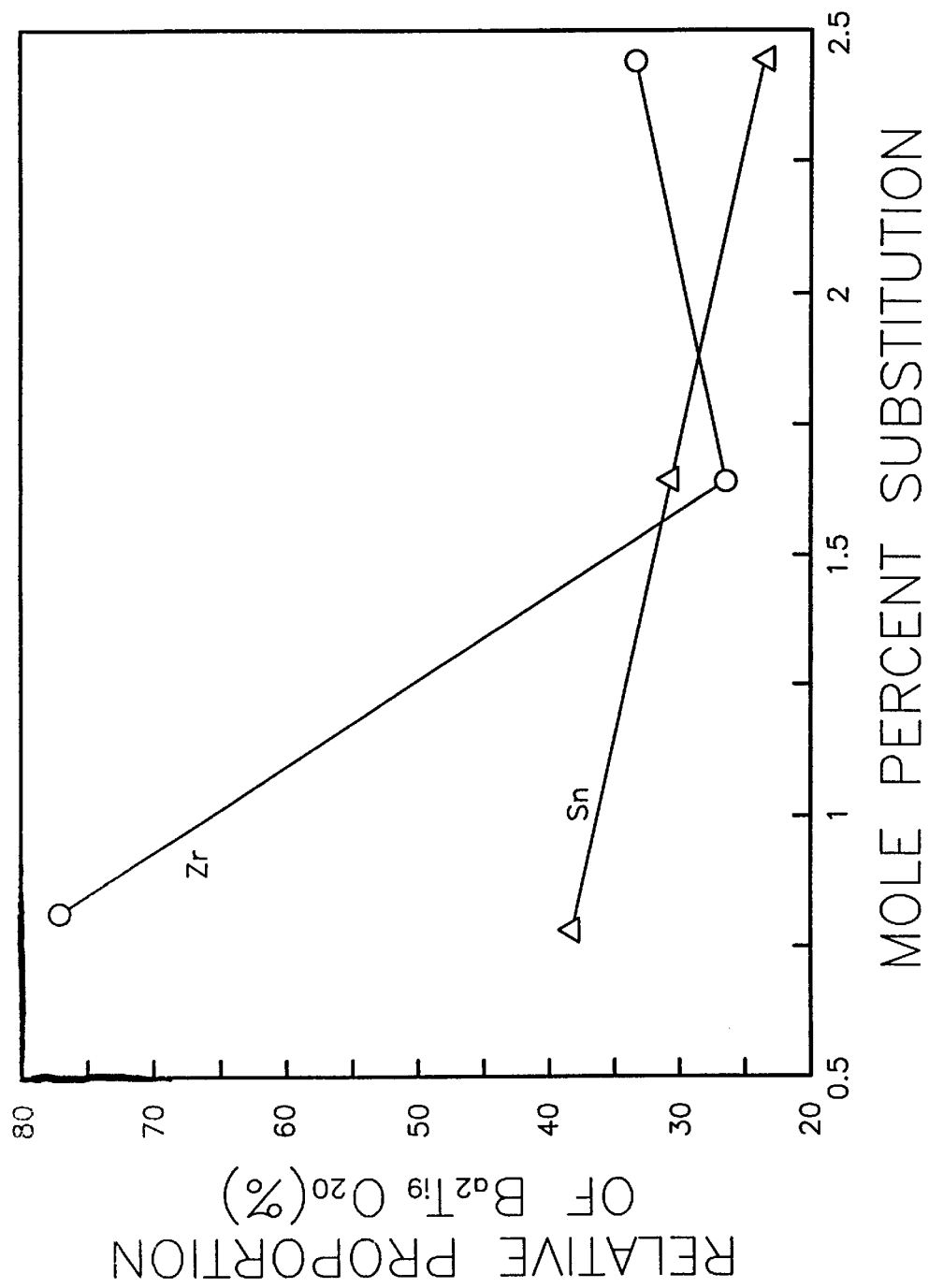
FIG. 1 is a graph illustrating the relative proportion of $Ba_2Ti_9O_{20}$ in doped compositions formed from $BaCO_3$ (electronic grade), TiO$_2$ (anatase, electronic grade), and various mole percentages of ZrO$_2$ and SnO$_2$ (substituted for part of the TiO$_2$), pre-reacted at 1200° C. for 4 hours.

With reference now to the drawings wherein like reference numerals designate corresponding parts throughout the several views, zirconium (Zr) doped compositions of Ba$_2$Ti$_9$O$_{20}$ may be formed from starting raw materials containing barium (Ba), titanium (Ti), and zirconium (Zr). Suitable starting raw materials include barium titanates (e.g., Ba$_2$TiO$_4$, BaTiO$_3$, BaTi$_2$O$_5$, Ba$_6$Ti$_{17}$O$_{40}$, Ba$_4$Ti$_{13}$O$_{30}$, BaTi$_3$O$_7$, BaTi$_4$O$_9$, and BaTi$_5$O$_{11}$), barium zirconates (e.g., Ba$_2$ZrO$_4$ and Ba$_3$Zr$_2$O$_7$), zirconium titanates (e.g., ZrTiO$_4$ and Zr$_5$Ti$_7$O$_{24}$), barium hydroxide (Ba(OH)$_2$), barium oxide (BaO), and titanium oxides (e.g., anatase (TiO$_2$), rutile (TiO$_2$), and Ti$_2$O$_3$).

In a preferred embodiment of the invention, zirconium (Zr) doped compositions of Ba$_2$Ti$_9$O$_{20}$, in powdered form, are formed from BaCO$_3$ (electronic grade), TiO$_2$ (anatase, electronic grade), and various mole percentages of ZrO$_2$, which are substituted for a portion of the TiO$_2$. Up to 3.0 mol % of ZrO$_2$ can be added to stabilize Ba$_2$Ti$_9$O$_{20}$, i.e., Ba$_2$Ti$_{9-x}$Zr$_x$O$_{20}$, where x is not larger than 0.33. In a preferred embodiment of the invention, TiO$_2$ is substituted with 0.82 and 1.64 mol % ZrO$_2$. A doped composition is also formed by substituting 2.46 mol % ZrO$_2$ for a portion of the TiO$_2$. For purposes of comparison, tin (Sn) doped compositions of Ba$_2$Ti$_9$O$_{20}$ are also formed by the same process, with SnO$_2$ being substituted instead of ZrO$_2$. These compositions are referred to hereinafter as "0.82% Zr", "1.64% Zr", "2.46% Zr", "0.82% Sn", "1.64% Sn", and "2.46% Sn", depending on the mol % of the substituted ZrO$_2$ and SnO$_2$.

The powders for each doped composition are then mixed with a carrier and a dispersing agent in plastic bottles with ZrO$_2$ grinding media overnight, forming slurries. The carrier may be any suitable carrier, such as deionized water or alcohol. In a preferred embodiment of the invention, deionized water is used as the carrier. The slurries are then dried and calcined/pre-reacted in the range from around 900° C. to around 1350° C. for a time period in the range from around 1 hour to around 24 hours. In a preferred embodiment of the invention, the slurries are prereacted at 1200° C. for 4 hours, again forming powders.

The powders are then re-milled in the carrier, which in the preferred embodiment is deionized water. Fifteen gram powder samples for each doped composition are uniaxially pressed into 22.5 mm diameter pellets. Pellets of each doped composition are sintered by heating at up to 1420° C. for time periods of up to 24 hours. In a preferred embodiment of the invention, the pellets are sintered by heating at around 1390° C. for around 6 hours. Other pellets of each doped composition are sintered by heating at around 1390° C. for around 16 hours. The sintering is done in an appropriate media, such as flowing oxygen, static oxygen, flowing air, or static air. In a preferred embodiment, sintering is done in flowing oxygen The sintered pellets are cut perpendicularly to the cylindrical axis to form parallel faces and their side walls are ground. These pellets are referred to hereinafter as the "6 hour specimens" and the "16 hour specimens". The microwave properties of the TE$_{018}$ mode of each specimen are measured at 3 GHz using a microwave network analyzer (such as model 8510C, Pulsed-RF Network Analyzer, Hewlett-Packard Company, Santa Clara, Calif.). The unloaded quality factor of each specimen within the microwave cavity of brass coated with silver is measured from the reflection coefficient and peak width. The drift of resonance frequency with temperature is measured using a microwave cavity of invar alloy in a vacuum oven. Only specimens of high quality factor and relative permittivity are evaluated for their temperature coefficient of resonance frequency. The dielectric constants are measured by the Kobayashi method. Y. Kobayashi and M. Katoh, "Microwave Measurement of Dielectric Properties of Low-Loss Materials by the Dielectric Rod Resonator Method," *IEEE Trans. On Microwave Theory Tech.*, MTT-33 [7]586-92 (1985). Brass conducting plates 6 times the specimen diameter are located on upper and lower radial surfaces, and the plates are electrically connected.

X-ray diffraction (using a unit such as a model 12054 X-ray diffraction unit, Phillips Electronic Instruments Co., Mount Vernon, N.Y.) is used for phase analysis with a step size of 0.15° and a sampling time of 1 or 3 seconds. The samples are then polished with and without thermal etching. The microstructure along the specimen cross section is then examined using scanning electron microscopy (such as a model S-800, field emission scanning electron microscope, Hitachi, Ltd., Tokyo, Japan). The weight change during a sintering period at 1390° C. is monitored, using a thermogravimetric analyzer (such as model STA 409C, Simultaneous Thermal Analyzer, Netzsch Inc., Exton, Pa., which is coupled with a computer interface).

Pre-reacting the composition at 1200° C. and holding for 4 hours forms $Ba_2Ti_9O_{20}$ and $BaTi_4O_9$, along with minute amounts of $BaCO_3$ and $TiO_2$. These phases are observed to be present in all $SnO_2$ and $ZrO_2$-substitued samples, pre-reacted at 1200° C.

FIG. 1 is a graph of the relative proportion of $Ba_2Ti_9O_{20}$ formed for each of the different mol % substitutions of $ZrO_2$ and $SnO_2$, pre-reacted at 1200° C. As shown in FIG. 1, pre-reaction of the 0.82% Zr composition results in significantly greater stabilization of $Ba_2Ti_9O_{20}$, than when the same concentration of $SnO_2$ (0.82% Sn) is used. The relative percentages of $Ba_2Ti_9O_{20}$ after this heat treatment decreased with increasing concentrations of $SnO_2$. This was also markedly the case for the $ZrO_2$-substituted samples, with the exception of the highest concentration (2.46% Zr).

After sintering at 1390° C. for 6 hours or 16 hours, monophase $Ba_2Ti_9O_{20}$ is present in the specimens doped with tin and zirconium ions, with the exception of the 2.46% Zr specimens, which are composed of $Ba_2Ti_9O_{20}$, $BaTi_4O_9$, $TiO_2$, and $ZrO_2$. Based on relative XRD intensities, the longer sintering period (16 hours) for this latter composition decreased the relative proportion of $Ba_2Ti_9O_{20}$ (to $BaTi_4O_9$).

Analysis of scanning electron microscope images of the pellets shows that the porosity increases (in size and frequency) with sintering time for 0.82% Zr. The porosity is located at grain boundaries, and not necessarily at triple points. Unreacted titania is present in the 2.46% Zr specimens, which also exhibit higher porosity than the 0.82% Zr specimens heat-treated for the same time period.

Figure 2:
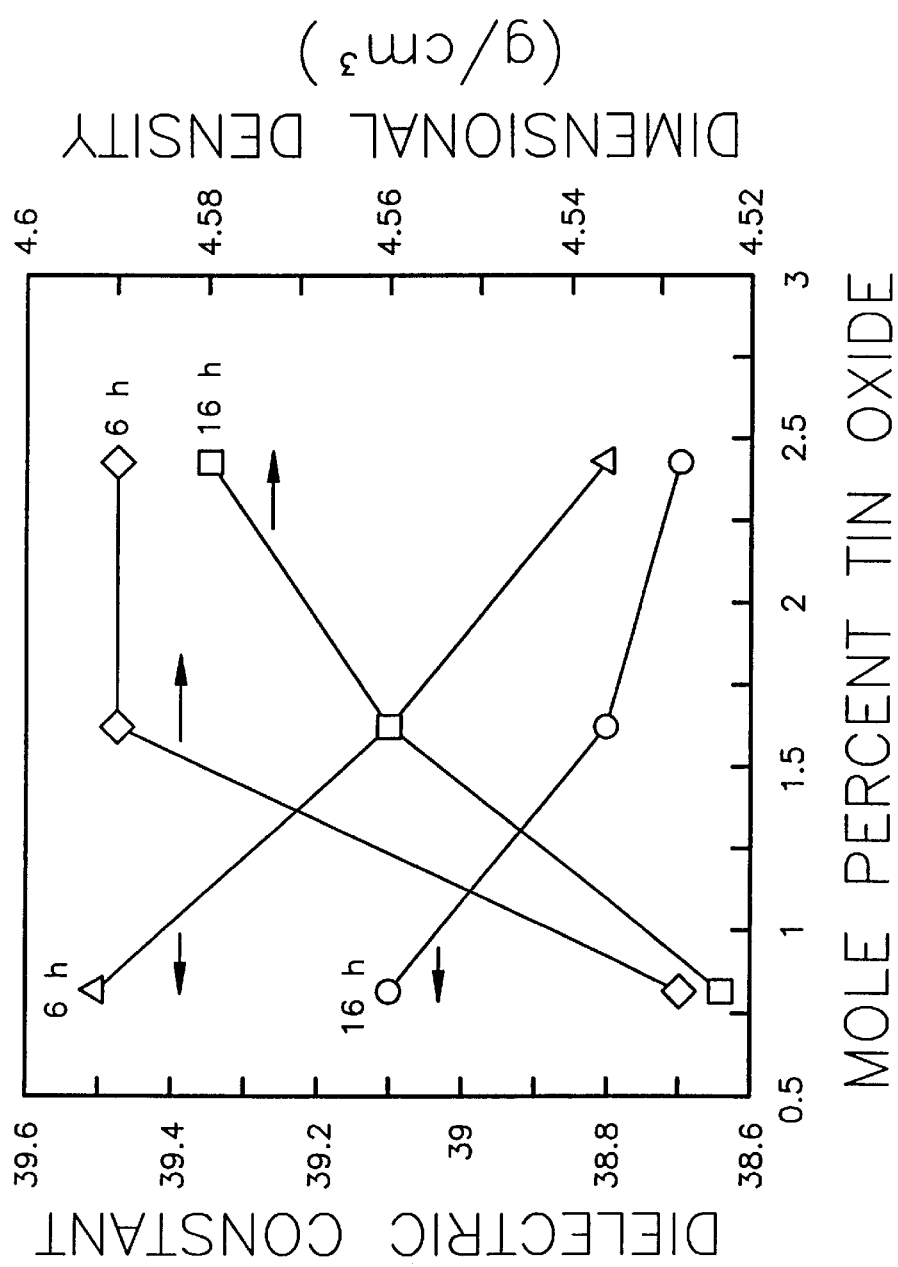
FIG. 2 is a graph illustrating the effects in the microwave frequency range (3 GHz) of SnO$_2$ additions and sintering times on the dimensional densities and dielectric constants of doped compositions of Ba$_2$Ti$_9$O$_{20}$ formed at 1390° C. from BaCO$_3$ (electronic grade), TiO$_2$ (anatase, electronic grade), and various mole percentages of SnO$_2$ (substituted for part of the TiO$_2$), pre-reacted at 1200° C. for 4 hours.

FIG. 2 is a graph illustrating the effects of $SnO_2$ doping and sintering times on the dimensional densities and dielectric constants of the Sn-doped compositions in the microwave frequency range (3 GHz). As illustrated in FIG. 2, the dimensional density of the sintered pellets increases with increasing $SnO_2$ content, while the dielectric constant decreases, for both sintering periods. A longer sintering period, e.g. 16 h v. 6 h, fosters a decrease in the density and dielectric constants.

Figure 3:
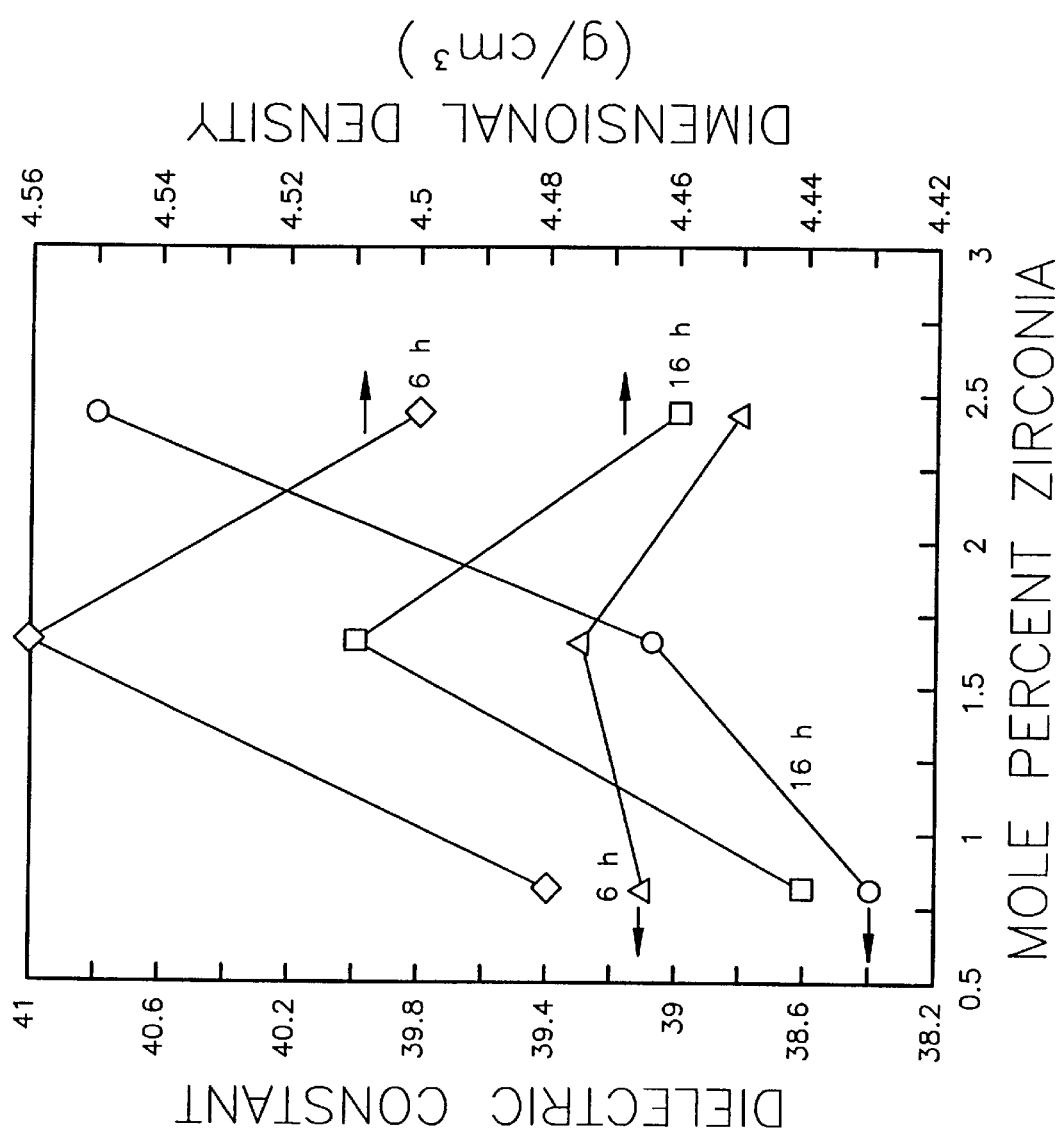
FIG. 3 is a graph illustrating the effects in the microwave frequency range (3 GHz) of ZrO$_2$ additions and sintering times on the dimensional densities and dielectric constants of doped compositions of Ba$_2$Ti$_9$O$_{20}$ formed at 1390° C. from BaCO$_3$ (electronic grade), TiO$_2$ (anatase, electronic grade), and various mole percentages of ZrO$_2$ (substituted for part of the TiO$_2$), pre-reacted at 1200° C. for 4 hours

FIG. 3 is a graph illustrating the effects of $ZrO_2$ doping and sintering times on the dimensional densities and dielectric constants of the Zr-doped compositions in the microwave frequency range (3 GHz). As illustrated in FIG. 3, the 1.64% Zr samples for both the 6 hour and 16 hour sintering times show maxima in dimensional densities. With increasing $ZrO_2$ substitution, the dielectric constants generally follow the trend of dimensional density, an exception being the lower density 2.46% Zr specimen sintered for 16 hours, which exhibits the highest dielectric constant.

Figure 4:
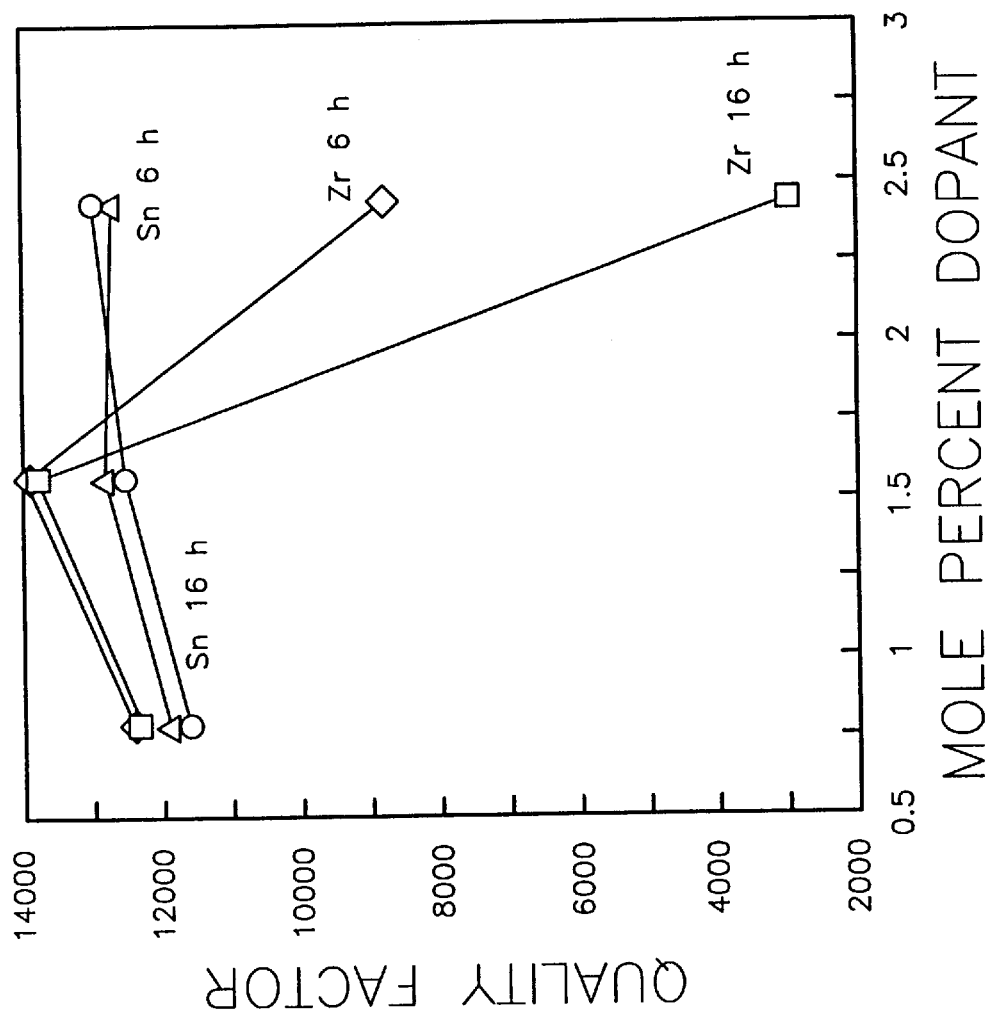
FIG. 4 is a graph illustrating the effects at 3 GHz of SnO$_2$ and ZrO$_2$ dopants and sintering times on the quality factor of doped compositions of Ba$_2$Ti$_9$O$_{20}$ formed at 1390° C. from BaCO$_3$ (electronic grade), TiO$_2$ (anatase, electronic grade), and various mole percentages of ZrO$_2$ and SnO$_2$ (substituted for part of the TiO$_2$), pre-reacted at 1200° C. for 4 hours.

FIG. 4 is a graph illustrating the effects at 3 GHz of $SnO_2$ and $ZrO_2$ dopants and sintering times on the quality factor of doped compositions of $Ba_2Ti_9O_{20}$ formed from $BaCO_3$ (electronic grade), $TiO_2$ (anatase, electronic grade), and various mole percentages of $ZrO_2$ and $SnO_2$ (substituted for part of the $TiO_2$), pre-reacted at 1200° C. for 4 hours. FIG. 4 shows the quality factors as a function of dopants and sintering times at 1390° C. The quality factors of specimens sintered for 6 hours increase moderately from 11900 to 12900 as $SnO_2$ content is increased from 0.82% to 1.64%, and remains largely unchanged for the 2.46% Sn pellets. For these samples, the sintering period had no significant influence on the quality factor.

FIG. 4 also illustrates that increasing the Zr doping level from 0.82% to 1.64% improves the quality factor to a maximum measured (13,900). The quality factor degrades precipitously in the 2.64% Zr specimens, especially for the 16 hour sintering period.

Figure 5:
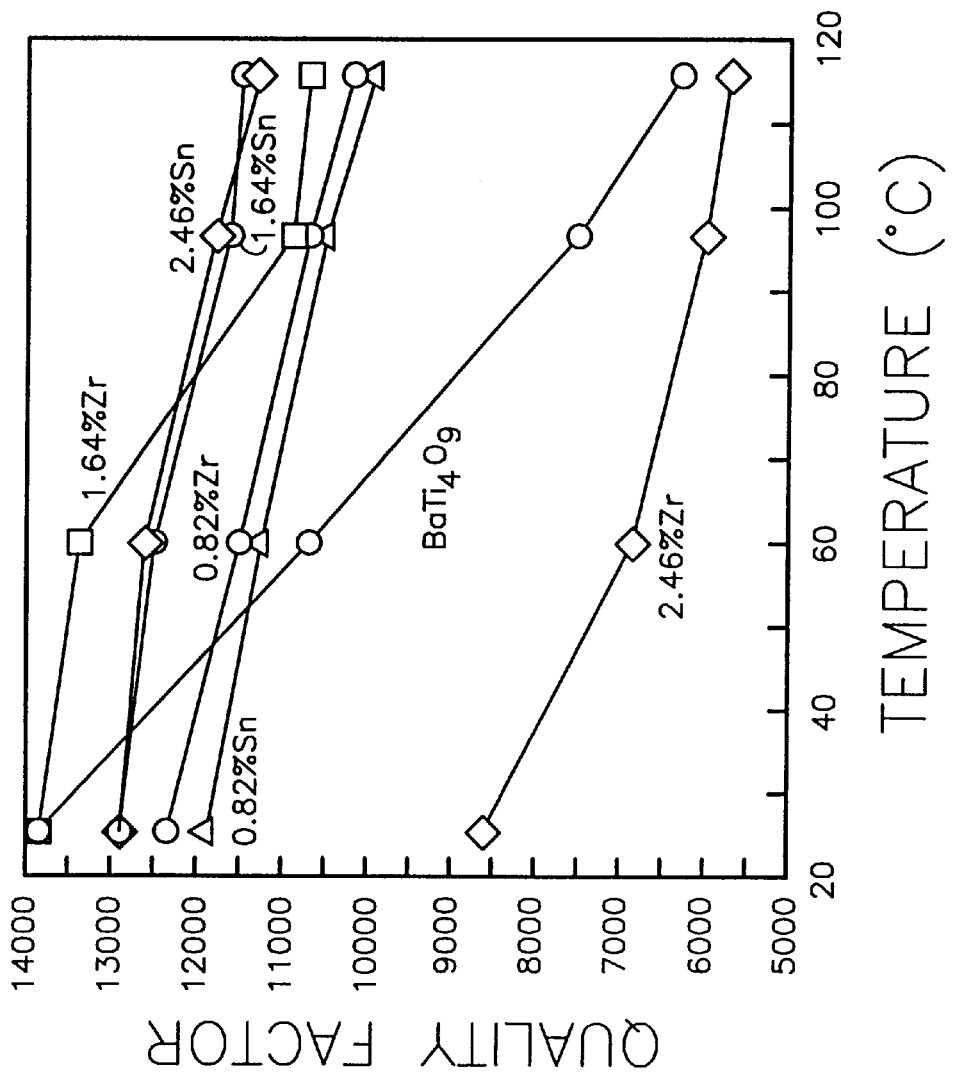
FIG. 5 is a graph illustrating the effects of SnO$_2$ and ZrO$_2$ dopants on the quality factor of doped compositions of Ba$_2$Ti$_9$O$_{20}$ formed from BaCO$_3$ (electronic grade), TiO$_2$ (anatase, electronic grade), and various mole percentages of ZrO$_2$ and SnO$_2$ (substituted for part of the TiO$_2$), pre-reacted at 1200° C. for 4 hours, as a function of temperature for specimens sintered at 1390° C. for 6 hours.

FIG. 5 is a graph illustrating the effect of $SnO_2$ and $ZrO_2$ dopants on the quality factor of doped compositions of $Ba_2Ti_9O_{20}$ formed from $BaCO_3$ (electronic grade), $TiO_2$ (anatase, electronic grade), and various mole percentages of $ZrO_2$ and $SnO_2$ (substituted for part of the $TiO_2$), pre-reacted at 1200° C. for 4 hours, as a function of temperature for specimens sintered at 1390° C. for 6 hours. As illustrated in FIG. 5, the quality factor of all Sn-doped and the 0.82% Zr specimens, sintered for 6 hours, decreases by about 14% as the measurement temperature increases from 25° C. to 117° C. The specimens with greater $ZrO_2$ substitutions exhibit a greater diminution in quality factor with increasing temperature. For purposes of comparison, a reduction in quality factor in excess of 50% over the same temperature range is observed for a specimen composed of $BaTi_4O_9$.

Figure 6:
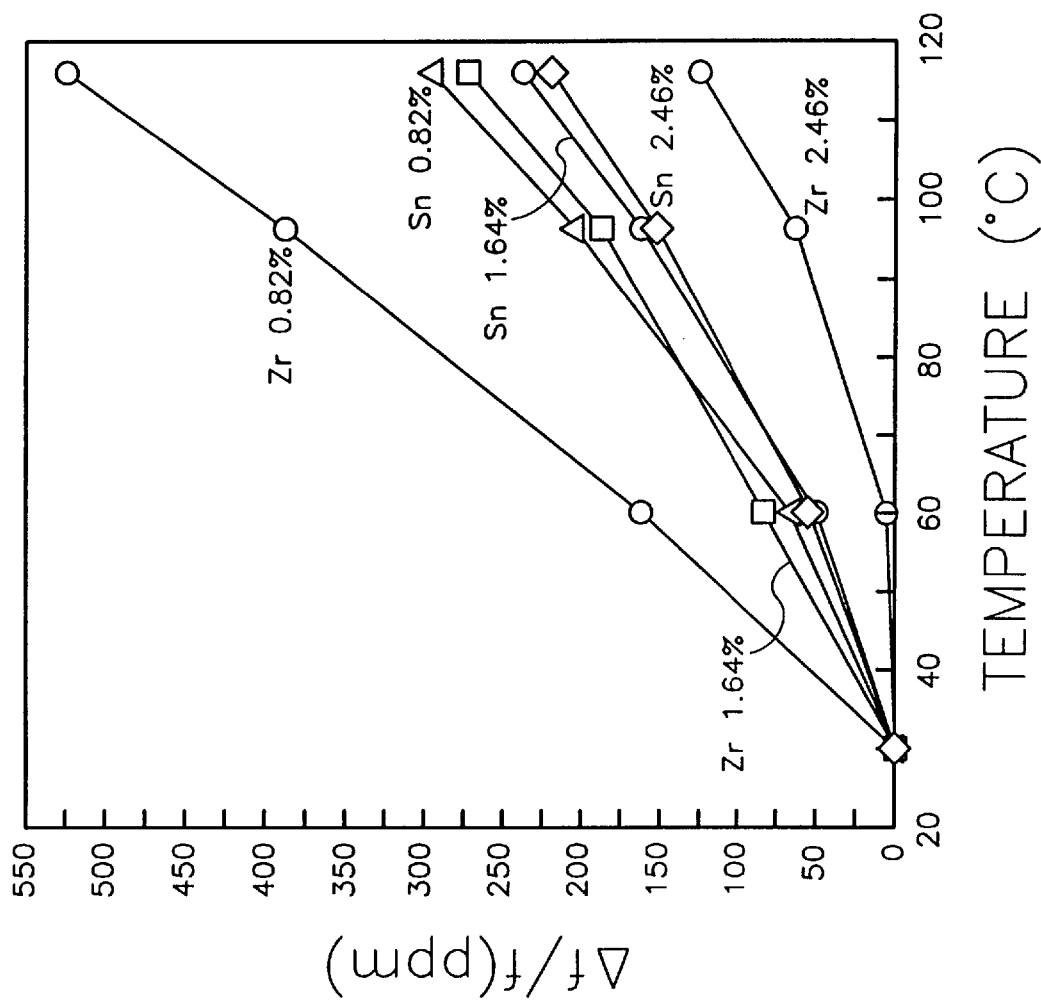
FIG. 6 is a graph illustrating the effects of SnO$_2$ and ZrO$_2$ dopants on the frequency drift (relative to room temperature) and temperature coefficients (slopes of lines) of resonance frequency of doped compositions of Ba$_2$Ti$_9$O$_{20}$ formed from BaCO$_3$ (electronic grade), TiO$_2$ (anatase, electronic grade), and various mole percentages of ZrO$_2$ and SnO$_2$ (substituted for part of the TiO$_2$), pre-reacted at 1200° C. for 4 hours, for specimens sintered at 1390° C. for 6 hours.

FIG. 6 is a graph illustrating the effect of $SnO_2$ and $ZrO_2$ dopants on the frequency drift (relative to room temperature) and temperature coefficients of resonance frequency (slopes of lines) of doped compositions of $Ba_2Ti_9O_{20}$ formed from $BaCO_3$ (electronic grade), $TiO_2$ (anatase, electronic grade), and various mole percentages of $ZrO_2$ and $SnO_2$ (substituted for part of the $TiO_2$), pre-reacted at 1200° C. for 4 hours, for specimens sintered at 1390° C. for 6 hours.

As illustrated in FIG. 6, the temperature coefficient (slope) decreases with Zr additions, whereas trends are not defined with increasing Sn concentration. Amongst all doped specimens, the 2.46% Zr specimens exhibit the minimum temperature coefficient (0.1 ppm/° C. between 25 to 60° C.), while the 0.82% Zr specimens exhibit the maximum temperature coefficient (7.0 ppm/° C. between 97–117° C.).

FIG. 7 is a table summarizing the microwave properties of doped compositions of $Ba_2Ti_9O_{20}$ formed from $BaCO_3$ (electronic grade), $TiO_2$ (anatase, electronic grade), and various mole percentages of $ZrO_2$ and $SnO_2$ (substituted for part of the $TiO_2$), pre-reacted at 1200° C. for 4 hours. To illustrate the superior results obtained by doping the $Ba_2Ti_9O_{20}$, FIG. 7 also summarizes the microwave properties of additional compositions of $Ba_2Ti_9O_{20}$ that are not doped with either Zr or Sn, but which have 1.64 mol % excess $TiO_2$. For comparison purposes, FIG. 7 also summarizes the microwave properties of compositions of $BaTi_4O_9$.

Pre-reaction heat treatment at 1150° C. of the 0.82% Zr specimen showed that mostly $BaTi_4O_9$ formed, while pre-reaction at 1200° C. formed $Ba_2Ti_9O_{20}$ and $BaTi_4O_9$. This indicates that in the process of reaction of batch constituents, $BaTi_4O_9$ formed first, which then further reacted with $TiO_2$ over time to form $Ba_2Ti_9O_{20}$. It is therefore postulated that $BaTi_4O_9$ has a higher solubility for large cation replacement of $Ti^{4+}$ than does $Ba_2Ti_9O_{20}$ at 1250° C. If this is the case, higher doping concentrations would resist conversion to $Ba_2Ti_9O_{20}$ since some of the soluble dopant would have to be rejected. Formation of $Ba_2Ti_9O_{20}$ with no doping requires significantly more time (and a sintering temperature of 1390° C.); the dilation of the $BaTi_4O_9$ unit cell via small concentrations of dopants appears to facilitate reaction with $TiO_2$ to most rapidly form $Ba_2Ti_9O_{20}$ at 1390° C.

Re-milling the heat-treated powder facilitated mixing of the phases initially formed, e.g. $BaTi_4O_9$, and the unreacted $TiO_2$. Sintering at 1390° C. for 6 hours and 16 hours resulted in formation of monophase $Ba_2Ti_9O_{20}$ for all substituted compositions, except the 2.46% Zr batch which still contained unreacted $ZrO_2$. This indicates that the solubility of $Sn^{4+}$ in $Ba_2Ti_9O_{20}$ is higher than that of $Zr^{4+}$. This can be attributed to the smaller ionic size of the tin ion, compared to zirconium, for substitution into $Ti^{4+}$ positions with less distortion.

For comparison purposes, a control batch is formed with an excess of $TiO_2$, and no substitution with a Zr or Sn dopant. It is observed that an excess of $TiO_2$ in the batch does not promote the formation of $Ba_2Ti_9O_{20}$ after heat-treating at 1390° C. for 6 hours. Instead, it results in multiple-phase specimens composed of $Ba_2Ti_9O_{20}$, $BaTi_4O_9$, and $TiO_2$. The persistence of $BaTi_4O_9$ corresponds to the lack of the influence of substitutional solid solution ions. $BaTi_4O_9$ and $TiO_2$, having a lower density than $Ba_2Ti_9O_{20}$, led to sintered specimens of lower overall density.

All specimens sintered at 1390° C. for 6 hours in the current study had either equal or higher densities than those after the 16 hour sintering period. Higher porosity was observed in scanning electron microscope images of the microstructures sintered for 16 hours. In addition, thermogravimetric analysis showed a linear weight loss with time (0.044 wt % per hour) during an identical thermal schedule with a 16 hour sintering period. Above the incongruent melting temperature of $BaTi_4O_9$ (1432° C.), $TiO_2$ is in equilibrium with liquid phase. Dopant additions likely locally lowered the liquid-forming temperature below 1390° C. Such grain boundary liquid phase then volatilized over time, leaving increased porosity. This is corroborated by the shape and location of the pores observed in the scanning electron microscope images.

The increasing dimensional density of specimens sintered for both sintering periods with increasing $SnO_2$ content corresponds to the substitution of titanium ions with heavier tin ions, where the mass of the unit cell was increased more than its volume was dilated. The same explanation may be used in the Zr-doped specimens. An exception was the over-doped 2.46% Zr case, where lower density second phases lowered the overall dimensional density.

The dielectric constant decreased with increasing sintering period (for a given composition), with the exception of 2.46% Zr. The porosity formed with the 16 h sintering period introduced low dielectric constant vapor gaps in the material, decreasing the overall dielectric constant. For the 2.46% Zr sample, after sintering for 16 h at 1390° C., a more significant percentage of $TiO_2$ was detected by XRD (as compared to after 6 hours). The dielectric constant of $TiO_2$ (~100) is appreciably higher than $Ba_2Ti_9O_{20}$. Thus, the excess $TiO_2$ content in the 2.46% Zr sample sintered for 16 hours was responsible for the high measured dielectric constant.

With increasing Sn doping, the dielectric constant decreased. Since the electron cloud for the larger $Sn^{4+}$ is more polarizable than $Ti^{4+}$, $SnO_2$ substitutions would be expected to increase dielectric constant. Since the opposite effect was observed, it follows that the decreased ionic polarization associated with the larger Sn ion was the cause of the decreased measured dielectric constant. In contrast, the increase in dielectric constant with $ZrO_2$ additions (up to 1.64%) implies dominance of the electronic contribution to the dielectric constant.

Sintering time showed a distinct effect on sintered density, but minimal effect on the quality factor. Dielectric loss is known to be only minimally influenced by levels of porosity, since pores contain vapor which do not contribute to energy loss unless moisture is trapped inside the pores. However, the quality factor is strongly dependent on the condensed phases present in the microstructures. The degradation of quality factor in 2.46% Zr specimens may be attributed to dielectric losses via anharmonicities associated with boundaries between multiple phases. When specimens were heated for microwave property measurement, thermal agitation disturbed the harmonic resonance of the oscillators (electron clouds and ions), leading to a reduction in the quality factor.

As tabulated in FIG. 7, the temperature coefficient of $BaTi_4O_9$ is observed to be much higher than that of $Ba_2Ti_9O_{20}$ doped with either Zr or Sn. The 2.46% Zr sample, heat-treated for 6 hours did not form an appreciable volume percent of $TiO_2$ second phase; $TiO_2$ would have otherwise been expected to contribute to a significant rise in the specimen temperature coefficient (temperature coefficient for $TiO_2$: 400). Though the quality factor of undoped $BaTi_4O_9$ was the highest, its resonance frequency and quality factor were also the most sensitive to temperature change amongst all specimens. Therefore, application of $BaTi_4O_9$ would be limited to a temperature-stable environment, such as base stations for microwave broadcasting.

Six hours of sintering at 1390° C. is adequate to achieve microwave ceramics of high density. Longer duration causes density reduction because of slow volatilization of grain boundary liquid phase. Increased doping concentrations of tin oxide reduces the dielectric loss, stabilizes the resonance frequency, and only slightly affects permittivity. Similar microwave property improvements are observed in the Zr-doped specimens up to 1.64%. The temperature coefficient decreases with increasing Zr content, but is largely unaffected by Sn concentration. The Zr-doped specimens exhibit greater stability of their temperature coefficient over a wide range of temperatures.

While a specific process for producing Zr-doped $Ba_2Ti_9O_{20}$ in accordance with the present invention is described, it should be understood that alternative processes for producing such composition are anticipated. The feasible adjustments to the present invention include, but are not limited to, starting raw materials, processing temperatures, and sintering times. Examples of process modifications are in the utilization of other starting raw materials containing Ba, Ti, and Zr, to replace barium carbonate, titania, and zirconia that were used in the experiments described above for demonstration of the present invention. Such raw materials include, but are not limited to, barium titanates, barium zirconates, zirconium titanates, titanium oxides, barium oxide, and barium hydroxide. Barium oxide and barium hydroxide must be handled with additional care during ceramic processing, due to their basic nature in contact with moisture and water, which is well known in the art. Sintering temperatures and times are also adjustable to achieve similar property performances.

Furthermore, it will be obvious to those skilled in the art that many variations and modifications may be made to the preferred embodiments as described above without substantially departing from the spirit and scope of the present invention. It is intended that all such variations and modifications be included within the scope of the present invention, as set forth in the following claims.

Now, therefore, the following is claimed:

1. A ceramic composition for use in microwave wireless communications, comprising a composition that satisfies the formula: $Ba_2Ti_{9-x}Zr_xO_{20}$, where 0<x<0.09.

2. The composition of claim 1, wherein said Zr dopant is in the range from about 0.01 mol % to less than 0.818 mol %, based on the sum of the number of moles of Ba, Ti, and Zr in said composition.

3. The composition of claim 1, wherein said composition is formed from starting raw materials containing barium, titanium and zirconium.

4. The composition of claim 3, wherein said starting raw materials are $BaCO_3$, $TiO_2$, and $ZrO_2$.

5. The composition of claim 3, wherein said barium containing materials are chosen from the group consisting of barium titanates, barium zirconates, barium hydroxide and barium oxide; said titanium containing materials are chosen from the group consisting of barium titanates, zirconium titanates, and titanium oxides; and said zirconium containing materials are chosen from the group consisting of barium zirconates and zirconium titanates.

6. The composition of claim 4, wherein said Zr dopant present in said $ZrO_2$ is in the range from about 0.01 mol % to less than 0.818 mol %, based on the sum of the number of moles of Ba, Ti, and Zr in said composition.

7. The composition of claim 6, wherein said $ZrO_2$ is about 0.82 mol %.

8. The composition of claim 5, wherein said barium titanates are chosen from the group consisting of $Ba_2TiO_4$, $BaTiO_3$, $BaTi_2O_5$, $Ba_6Ti_{17}O_{40}$, $Ba_4Ti_{13}O_{30}$, $BaTi_3O_7$, $BaTi_4O_9$, and $BaTi_5O_{11}$.

9. The composition of claim 5, wherein said barium zirconates are chosen from the group consisting of $Ba_2ZrO_4$ and $Ba_3Zr_2O_7$.

10. The composition of claim 5, wherein said zirconium titanates are chosen from the group consisting of $ZrTiO_4$ and $Zr_5Ti_7O_{24}$.

11. The composition of claim 5, wherein said titanium oxides are chosen from the group consisting of anatase ($TiO_2$), rutile ($TiO_2$), and $Ti_2O_3$.

12. The composition of claim 6, wherein said composition is sintered at up to 1420° C. for a time period of up to 24 hours.

13. The composition of claim 6, wherein said composition is sintered at about 1390° C. for a time period of about 6 hours.

14. The composition of claim 7, wherein said composition is sintered at up to 1420° C. for a time period of up to 24 hours.

15. The composition of claim 7, wherein said composition is sintered at about 1390° C. for a time period of about 6 hours.

* * * * *